(12) United States Patent
Bourn et al.

(10) Patent No.: US 10,994,928 B2
(45) Date of Patent: May 4, 2021

(54) SMART WASTE RECEPTACLE

(71) Applicant: Garbi Inc., Lafayette, CA (US)

(72) Inventors: Brandon Bourn, San Francisco, CA (US); Brian Bourn, San Francisco, CA (US)

(73) Assignee: GARBI INC., Lafayette, CA (US)

( * ) Notice: Subject to any disclaimer, the term of this patent is extended or adjusted under 35 U.S.C. 154(b) by 0 days.

(21) Appl. No.: 16/428,896

(22) Filed: May 31, 2019

(65) Prior Publication Data
US 2020/0010271 A1 Jan. 9, 2020

Related U.S. Application Data

(63) Continuation of application No. 16/417,535, filed on May 20, 2019.

(60) Provisional application No. 62/694,919, filed on Jul. 6, 2018.

(51) Int. Cl.
| | |
|---|---|
| B65F 1/16 | (2006.01) |
| G06F 16/903 | (2019.01) |
| G06Q 30/06 | (2012.01) |
| G06Q 10/00 | (2012.01) |
| H04N 5/225 | (2006.01) |
| H04N 7/18 | (2006.01) |
| G06K 9/00 | (2006.01) |
| G06K 9/62 | (2006.01) |
| G06F 3/14 | (2006.01) |

(52) U.S. Cl.
CPC .......... *B65F 1/16* (2013.01); *G06F 16/90335* (2019.01); *G06K 9/00624* (2013.01); *G06K 9/628* (2013.01); *G06Q 10/30* (2013.01); *G06Q 30/0633* (2013.01); *H04N 5/2256* (2013.01); *H04N 7/183* (2013.01); *B65F 2210/128* (2013.01); *B65F 2210/138* (2013.01); *B65F 2210/139* (2013.01); *B65F 2210/168* (2013.01); *G06F 3/14* (2013.01)

(58) Field of Classification Search
CPC .................. B65F 1/16; B65F 2210/128; B65F 2210/168; B65F 2210/139; B65F 2210/138; G06Q 30/0633; G06Q 10/30; H04N 7/183; H04N 5/2256; G06K 9/00624; G06K 9/628; G06F 16/90335; G06F 3/14
See application file for complete search history.

(56) References Cited

U.S. PATENT DOCUMENTS

| | | | |
|---|---|---|---|
| 9,691,256 B2 * | 6/2017 | Wu | ........................ G08B 21/24 |
| 10,127,586 B2 * | 11/2018 | Beyagudem | ....... G06Q 30/0631 |
| 2003/0085163 A1 * | 5/2003 | Chan | ........................ B64F 1/366 |
| | | | 209/589 |

(Continued)

*Primary Examiner* — Wesley J Tucker
(74) *Attorney, Agent, or Firm* — Cognition IP, P.C.; Edward Steakley

(57) ABSTRACT

Embodiments relate generally to waste receptacles and more particularly to smart waste receptacles capable of identifying waste. A waste receptacle may identify waste using machine vision and perform a task in response to identifying the waste. In an embodiment, the smart waste receptacle may instruct a user to direct the waste to one of a plurality of waste bins based on a category of the waste. In an embodiment, the smart waste receptacle may place an order to replenish the stock of a product based on the identification of waste. In an embodiment, the smart waste receptacle is created by attaching a smart device to a standard waste receptacle.

19 Claims, 10 Drawing Sheets

(56) References Cited

U.S. PATENT DOCUMENTS

| | | | |
|---|---|---|---|
| 2014/0279290 A1* | 9/2014 | Rimnac | G06Q 10/087 705/28 |
| 2015/0144012 A1* | 5/2015 | Frybarger | G06Q 30/0241 100/102 |
| 2015/0348252 A1* | 12/2015 | Mask | G06K 9/00201 382/103 |
| 2015/0350610 A1* | 12/2015 | Loh | H04N 7/183 348/143 |
| 2016/0379291 A1* | 12/2016 | Esmailzadeh | H04L 51/32 705/26.64 |
| 2017/0243279 A1* | 8/2017 | Thompson | G01G 19/414 |
| 2018/0016096 A1* | 1/2018 | Krishnamurthy | B65F 1/1426 |
| 2018/0075417 A1* | 3/2018 | Gordon | G05D 1/0088 |
| 2018/0271501 A1* | 9/2018 | Wang | E03D 9/00 |
| 2018/0286250 A1* | 10/2018 | Cronin | G06Q 50/12 |

\* cited by examiner

SMART WASTE RECEPTACLE

CROSS-REFERENCE TO RELATED APPLICATIONS

This application is a continuation of U.S. patent application Ser. No. 16/417,535, filed May 20, 2019, which claims the benefit of U.S. Provisional Patent Application No. 62/694,919, filed Jul. 6, 2018, which are all hereby incorporated by reference in their entirety.

FIELD OF INVENTION

The present disclosure relates generally to waste receptacles and more particularly to smart waste receptacles capable of identifying waste.

BACKGROUND

Waste receptacles include trash cans, garbage cans, recycling bins, dumpsters, and other such containers for holding waste for collection. Some waste receptacles are intended for certain kinds of waste. For example, recycling bins are for recyclable waste. However, it is difficult for end users to determine what waste is recyclable and what waste is not. Non-recyclable waste may contaminate a load of recyclable waste such that the entire load can no longer be recycled.

In addition, some online or brick and mortar retailers may offer a product subscription service or regularly scheduled delivery of products. These types of services and offerings are intended to help consumers and purchasers maintain an inventory of often-used products such as paper towels, toilet paper, or socks, for example. A delivery schedule is chosen based on an estimated need, such as one delivery per month, and followed regardless of use or stock levels of the product.

SUMMARY

Embodiments disclosed herein relate to smart waste receptacles capable of identifying waste. In an embodiment, a smart waste receptacle system includes a smart waste receptacle. A sensor associated with the smart waste receptacle is configured to acquire an image of waste. A vision system is configured to receive the image of the waste from the camera and determine an identity of the based on the image.

In an embodiment, a smart waste receptacle includes a first waste bin associated with a first category of waste and a second waste bin associated with a second category of waste. As an example, the first category of waste may be recyclable waste and the second category of waste may be non-recyclable waste. A camera, or other sensor, is mounted on or near the smart waste receptacle and configured to acquire an image of waste as the waste is introduced to the smart waste receptacle. A sensor system is configured to receive the image of the waste from the camera and determine an identity of the waste based on the image. For example, an identity of the waste may be a particular product identification code such as a stock keeping unit (SKU) number, a barcode, a QR code or an indication of a particular brand of product. Other examples of an identity of waste include an identification of a logo, image, category, flavor, size, and other such identifying markers of waste. In some examples, an identity of the waste may be a more general category such as a type or category of product (e.g. an Apple). A controller is configured to receive the identity of the waste from the sensor system and, based on the identity, categorize the waste into either the first category or the second category; and then display an indication of the category of the waste via a display system. In an embodiment, the display system is a multicolored light that lights up in different colors corresponding to the categories of waste.

In an embodiment, smart waste receptacle is created by attaching a smart device to a non-smart waste receptacle. In an embodiment, a sensor associated with the smart device is configured to acquire an image of waste. A vision system is configured to receive the image of the waste from the sensor and determine an identity of the waste based on the image. An adhesive or other fastener attaches the smart device to the waste receptacle.

In some embodiments, the smart waste receptacle may reorder supplies based on the identified waste. For example, the smart waste receptacle may place an order for a product corresponding to the waste. In some embodiments, the smart waste receptacle may automatically identify waste as being designated for automatic replenishment. In some embodiments, a user may provide explicit instructions via a user interface to reorder a product corresponding to the waste. Some embodiments further relate to gathering information from a plurality of smart waste receptacles to determine product usage patterns and habits.

A method of sorting waste using a smart waste receptacle is disclosed. In an embodiment, a smart waste receptacle may have a first waste bin associated with a first classification of waste and a second waste bin associated a second classification of waste. The smart waste receptacle may receive an image of waste being discarded into the smart waste receptacle and, based on the image, identify the waste. Then, based on the identification of the waste, the smart waste receptacle may classify the waste as belonging to either the first classification or the second classification. The classification may then be displayed to a user, or instructions displayed for directing the waste to one of the waste bins of the smart waste receptacle.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
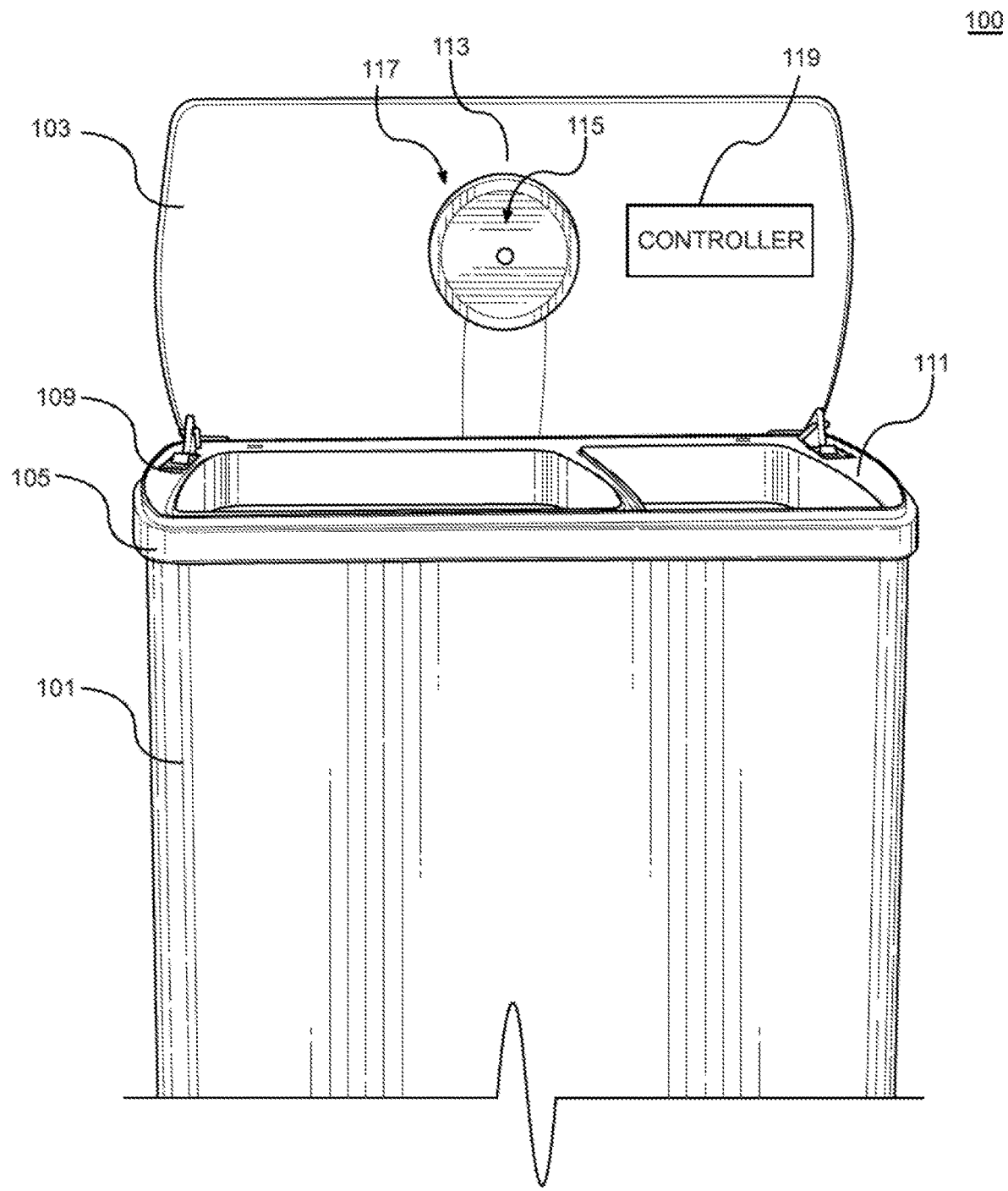
FIGS. 1A-B illustrate a smart waste receptacle according to an embodiment.
Figure 1B:
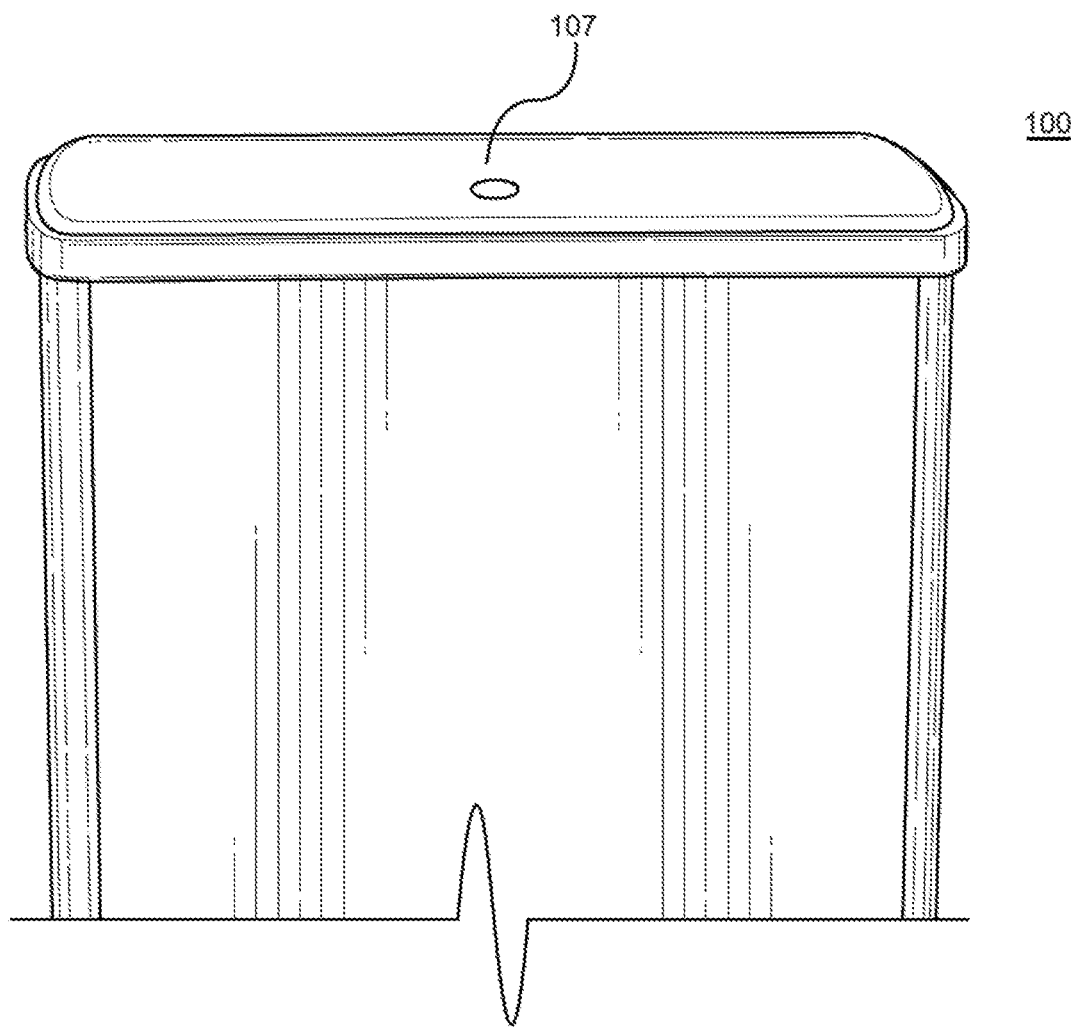

FIGS. 1A-B illustrate a smart waste receptacle 100 according to an embodiment. Bin 101 is sized to accept waste and lid 103 covers bin 101 when closed. A foot pedal may actuate lid 103 when stepped on. In an embodiment, lid 103 is actuated by electric motor or other mechanical actuator that is activated by manual operation, proximity, motion, or pressure. Around the top of bin 101 are indicator lights 105. In an embodiment, indicator lights 105 are comprised of a series of multi-colored LED lights placed around the opening of bin 101. In an embodiment, indicator lights 105 may be a set of labelled lights that correspond to the various user feedback options discussed herein. In some embodiments, indicator lights 105 may include an LCD screen displaying a graphical user interface of a computer, or a similar display device. In an embodiment, indicator lights 105 may be located on top of the lid. In an embodiment, the smart waste receptacle 100 communicates with a separate user device, such as a mobile device or other computer system, and causes the display of information on the user device, such as through an app. Indicators from the smart waste receptacle 100, as described herein, may be displayed to the user on the user device.

User input 107 illustrated in FIG. 1B is located on top of lid 103 and receives instructions from a user of the smart waste receptacle. In an embodiment, user input 107 includes one or more buttons, for example. User input may be located at different locations in various embodiments. For example, in an embodiment, user input 107 may be located on the body of bin 101, or on a separate control panel located near the smart waste receptacle 100. In an embodiment, user input 107 is comprised of a touchscreen interface integrated into an LCD screen. In various embodiments, user interface may include physical buttons, touch-sensitive buttons or components, or gesture-based input devices, for example. In some embodiments, user input 107 may be a visual interface configured to detect certain user actions. For example, instead of touching a physical button to signal a reorder, the user may deliberately display an item to the sensor for several seconds. The detection of the object over a certain period of time or through a certain gesture may comprise a user input to the system. In some embodiments, user input 107 may be a voice interface configured to detect key words or phrases. For example, a user may issue a verbal command as "reorder this" to the smart waste receptacle instead of touching a physical button. In such embodiments, smart waste receptacle 100 may include audio feedback such as verbal confirmation of received instructions.

In an embodiment, bin 101 may be a single bin. In some embodiments, bin 101 may be comprised of two or more bins, each for a different class of waste. For example, in an embodiment, a smart waste receptacle may include trash bin 109 and recycling bin 111 for non-recyclable and recyclable waste, respectively. Similarly, in an embodiment, a smart waste receptacle may include a trash bin, a paper recycling bin, a glass recycling bin, a metal recycling bin, and a compost bin, for example. Each bin for each class of waste may be sized and shaped appropriately for that class of waste. For example, a non-recyclable waste bin may be sized larger than an accompanying recyclable waste bin if the expected use of the smart waste receptacle includes comparatively more non-recyclable waste than recyclable waste. Embodiments of a smart waste receptacle may include any number and combination of bins of various sizes for any number of respective waste classes.

Sensor system 113 is located on smart waste receptacle 100 positioned to view waste in or near the smart waste receptacle. In an embodiment, sensor system 113 is a sensor system based on one or more cameras and computer vision. In an embodiment, sensor system 113 is located on the underside of actuating lid 103 such that sensor system 113 is positioned to view waste as it is being placed into one of bins 109, 111 when lid 103 is in an open, or actuated, position. In an embodiment, sensor system may be located above the smart waste receptacle and positioned to view waste as it is being placed into the receptacle. In some embodiments, multiple sensor system components may be placed at disparate locations to acquire multiple angles or fields of view of waste. For example, in some embodiments, sensor system 113 includes cameras and/or other sensors placed within a bin of smart waste receptacle.

Sensor system 113 may include one or more sensors 115 to acquire sensor data, such as still or video images of waste being placed into smart waste receptacle 100. Sensors 115 may comprise image capture devices, cameras, ultrasonic sensors, radar, LIDAR, range finders, lasers, infrared sensors, and other sensors. Sensors 115 may be, for example, still or video cameras including CCD or CMOS sensors and accompanying lenses for acquiring an appropriate field of view of waste entering the receptacle. In some embodiments, the sensor system 113 may continuously record video use computer vision techniques to determine when waste is being discarded into a bin. Sensor system 113 may include supplemental lighting 117 to provide additional lighting in or around smart waste receptacle 100 to light waste as it enters the receptacle. Supplemental lighting 117 may include, for example, one or more LED lighting systems positioned and configured to light waste such that sensors 115 can acquire images of the waste. In some embodiments, portions of sensor system 113 may operate in 3D sensing techniques, such as range-gated imaging or time of flight sensing. In some embodiments, Sensor system 113 including sensors 115 and supplemental lighting 117 operate in the visible light spectrum. In some embodiments, portions of sensor system 113 may operate in other portions of the electromagnetic spectrum such as infrared or ultraviolet or multispectral. In such embodiments, one or more cameras and optional supplemental lighting may be configured to capture images in these portions of the electromagnetic spectrum. Embodiments of sensor system 113 may combine various cameras and optional supplemental lighting that acquire images in different portions of the electromagnetic spectrum in addition to portions of the visible light spectrum.

Controller 119 is a computing platform configured to capture and process images from sensor system 113, provide information via indicator lights 105, and orchestrate various other functions of smart waste receptacle 100. In some embodiments, controller 119 is a computer system including a processor and memory configured to execute instructions for performing any one or more of the methods discussed herein. Controller 119 may include various communications components such as Wi-Fi, Bluetooth, or RFID radio communications capabilities. Controller 119 may operate on battery power or main-AC power in various embodiments.

Controller 119 facilitates the analysis of images captured by sensor system 113. In some embodiments, controller 119 performs computer vision techniques to identify waste as it enters smart waste receptacle 100. In some embodiments, controller 119 captures images from sensor system 113 and transmits the images to a remote processing server. For example, in an embodiment, controller 119 may transmit image over the Internet to a server located in a remote datacenter to process the images. In some embodiments, this remote datacenter may be a commercially-available computer vision service, for example.

Figure 2:
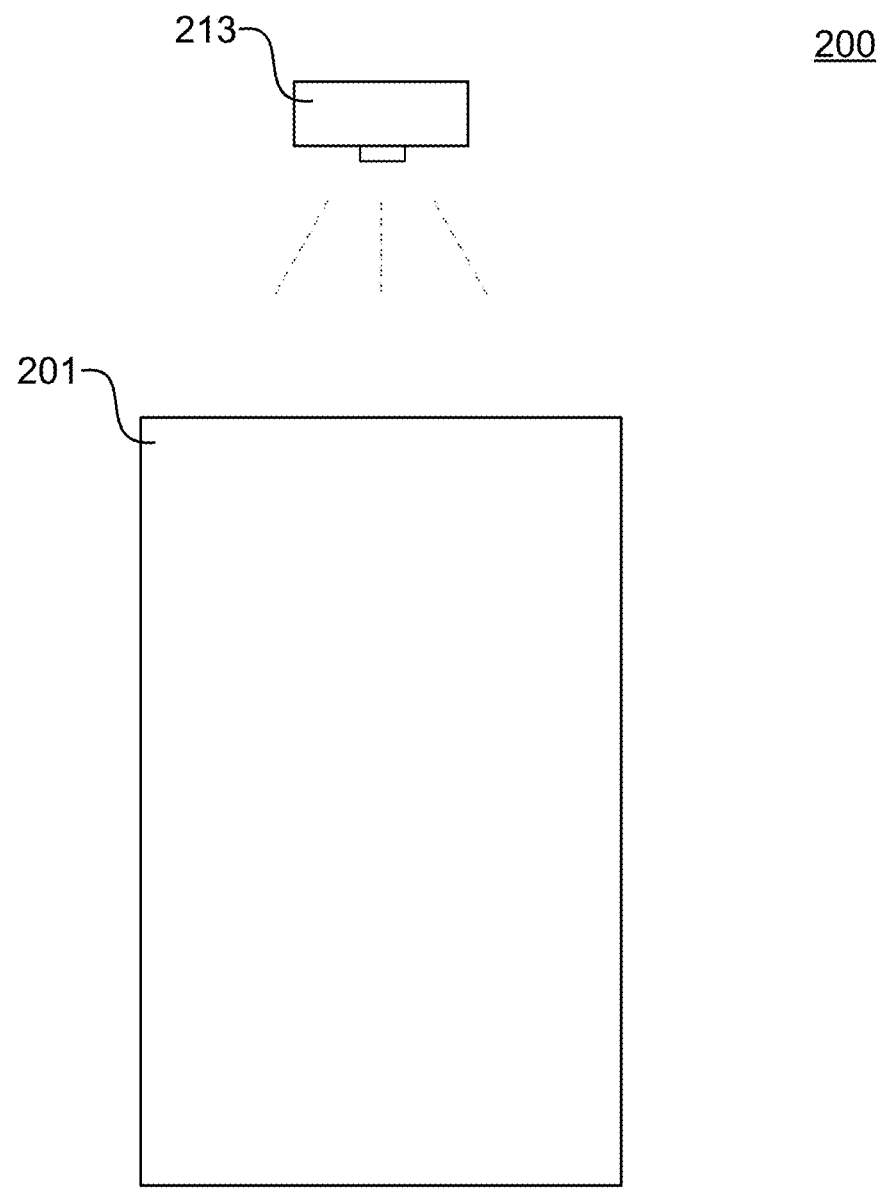
FIG. 2 illustrates a smart waste receptacle without a lid according to an embodiment.

FIG. 2 illustrates a smart waste receptacle 200 without a lid according to an embodiment. The smart waste receptacle 200 is similar to smart waste receptacle 100, however lacks a lid. In this example, sensor system 213 is mounted above the receptacle 201 to capture images of waste being discarded. Sensors may comprise image capture devices, cameras, ultrasonic sensors, radar, LIDAR, range finders, lasers, infrared sensors, and other sensors. In other embodiments, the sensor system 213 may be mounted in any position with a view of waste being discarded into the smart waste receptacle 200 such as being mounted to the side of the receptacle or in front of the receptacle, or any other position. In some embodiments, the sensor system 213 may continuously record video of the receptacle and use computer vision techniques to determine when waste is being discarded into a bin. In some embodiments, a motion sensor may be mounted on or near the smart waste receptacle to detect when waste is being discarded into the smart waste receptacle. In response to detecting motion, the sensor system 213 may then initiate recording to identify the waste being discarded.

Figure 8:
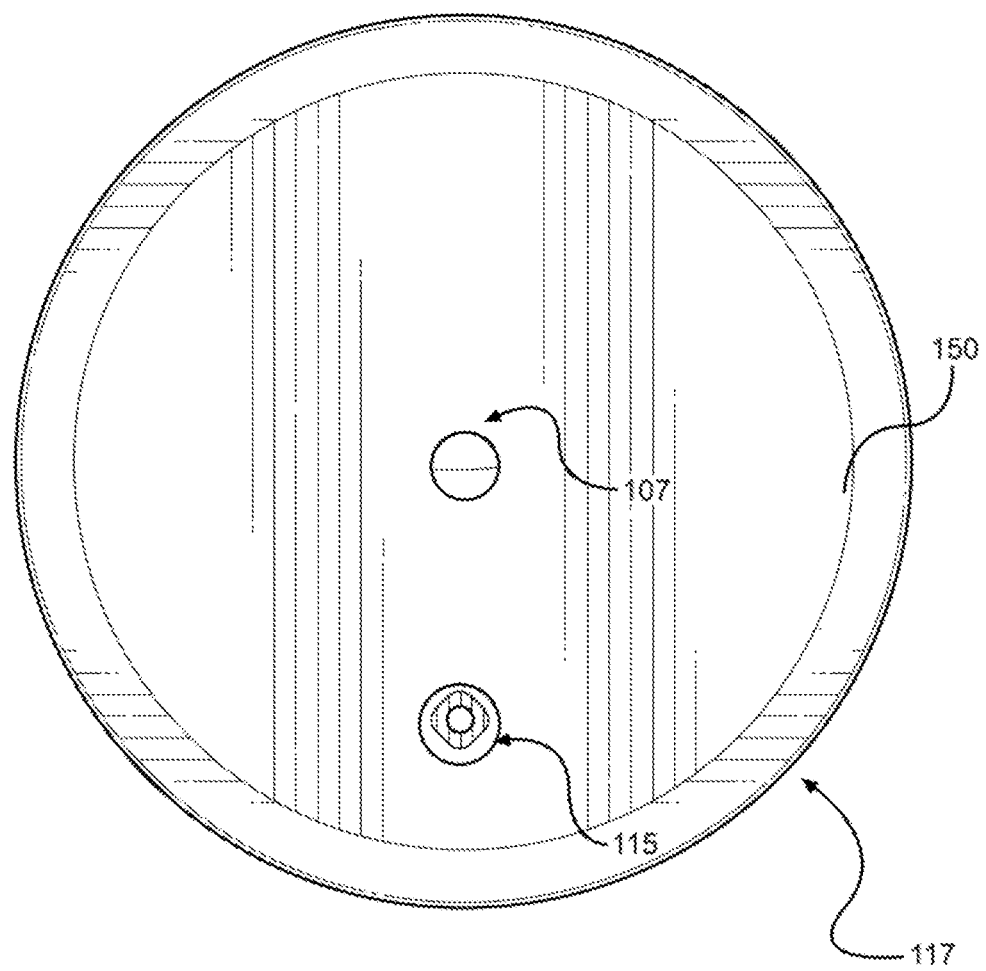
FIG. 8 illustrates an attachment that converts a non-smart waste receptacle into a smart waste receptacle according to an embodiment.

FIG. 8 illustrates an attachable device 150 that converts a non-smart waste receptacle into a smart waste receptacle 300, according to an embodiment. The attachable device 150 may work with lidded bin 101 or bin 201 without a lid. Bins 101 and 201 may be standard, non-smart trash bins. In an embodiment with a lid, the attachable device 150 may be attached to an actuating lid 103. In an embodiment without a lid, the attachable device 150 may be attached to a surface over the receptacle 201 and angled to capture sensor data from the direction of the receptacle. The smart waste receptacle 300 operates in the same manner as smart waste receptacle 100 and 200 and includes the same functionality, features, and components as described with respect to those receptacles as described herein. The attachable device 150 may comprised, for example, a sensor 115, supplemental lighting 117, and user input 107. Controller 119 may be located inside the attachable device 150. The sensor 115, supplemental 117, user input 107, and controller 119 function the same in smart waste receptacle 300 as described elsewhere herein. Optionally, an actuating motor may be attached to sensor 115 to allow the sensor 115 to find the ideal focal spot when the attachable device 150 is attached to a curved lid 103 or when a user has mounted it improperly. The actuating motor may be enabled to move the sensor 115 or change its focal position.

Figure 9:
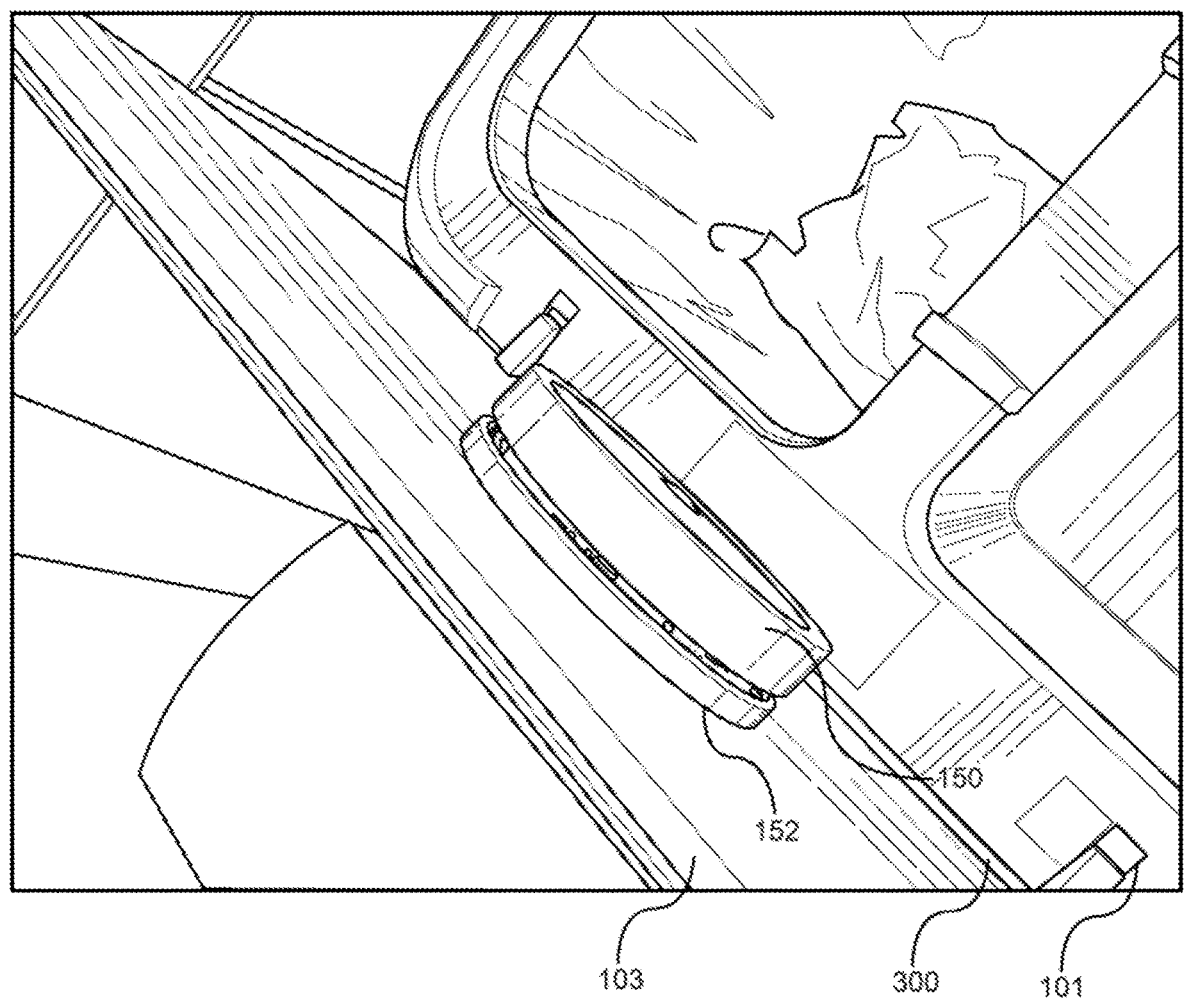
FIG. 9 illustrates an attachment on a lid of a non-smart waste receptacle to convert it into a smart waste receptacle.

FIG. 9 illustrates the mounting of the attachable device 150 on a non-smart bin 101. Adhesive 152 or other fasteners are used to mount attachable device 150 on a surface such as 103 or a surface above the bin 101.

Figure 3:
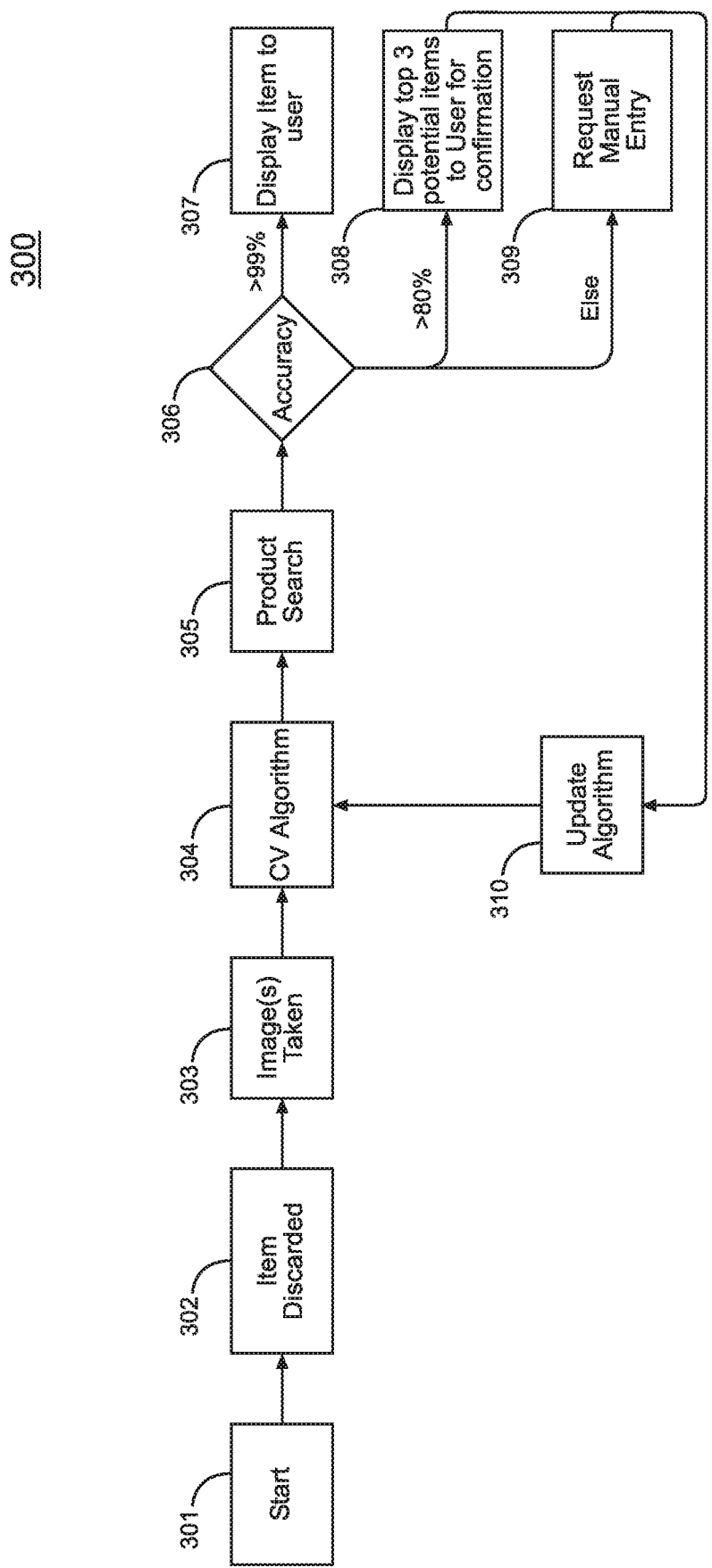
FIG. 3 illustrates a method for identifying waste as it enters a smart waste receptacle according to an embodiment.

FIG. 3 illustrates a method 300 for identifying waste as it enters a smart waste receptacle according to an embodiment. At step 301, a user engages a smart waste receptacle such as smart waste receptacle 100 or 200 or 300. For example, the user may engage a foot pedal to open the lid of the smart waste receptacle. This indicates to the smart waste receptacle that waste is going to be discarded into the receptacle. At step 302, the user presents the waste to a sensor system of the smart waste receptacle and the smart waste receptacle acquires one or more images of the waste as it is being discarded at step 303. In some embodiments, several different individual cameras may comprise the sensor system and each take a different angle of the waste, each with different lighting and fields of view. Each camera angle may take one or more than one images of the waste, or a video sequence comprising a plurality of frames of the waste as it is introduced to the smart waste receptacle.

At step 304, the imaging data is analyzed to recognize the waste being discarded. In some embodiments, computer vision techniques employing trained learning systems such as convolutional neural networks may be used by the smart waste receptacle to identify the waste. Features of the waste such as shape, size, material, text, brand, logos, barcodes, or colors may be identified in the image data to aide in identifying the waste. For example, a barcode on a piece of waste may be identifiable in the imaging data and provide a SKU number which identifies the product being discarded.

In some embodiments, the identity of the waste may be a particular product identity such as provided by a barcode as above. In some embodiments, the identity of the waste may be less precise, such as an identity of the brand of the product, the type of the product, or so on. For example, if a precise identity is not readily recognizable in the imaging data, perhaps a particular logo on the item is readily identifiable which provides some level of identification. Similarly, if no barcode or logo is identifiable, perhaps a type or category of product is. For example, a milk carton may be identifiable as a milk carton, even if no particular brand or barcode is detected. This may be the case when the waste is crumpled up or otherwise obscured in some way as refuse often is.

In some examples, the waste may be so mangled so as to not be individually identifiable in any meaningful way. In these cases, some information may still be recorded such as the estimated size of the waste, the color of the waste, or some behavior of the waste as it is introduced into the receptacle. For example, paper waste may exhibit a characteristic descent as it is dropped into a waste receptacle that more dense food waste would not. At step 305, any identity information such as SKU, brand, type, category, or the like, may be cross-referenced with a database of products to identify a product corresponding to the waste. Depending on the identity information used, an accuracy estimate is provided along with the identification of the product. For example, if a barcode was used to identify a product, the accuracy estimate may be very high. Conversely, if only a brand name was recognized on the waste, the accuracy estimate may be comparatively lower. And if few recognizable features of the waste were detected, the accuracy estimate may be very low.

In some embodiments, the smart waste receptacle may request user feedback as to the identification of waste. At step 306, the accuracy estimate of the product identification may be evaluated. If the accuracy is high, at step 307 the product or item may be displayed to the user. In FIG. 3, the threshold for high accuracy is illustrated as a 99% accuracy estimate, however in other embodiments, different measures or thresholds of confidence or accuracy may be used. For example, a high accuracy threshold may be expressed as a 0.85 probability on a scale between 0 and 1, or as a 4 on a 5-point scale. In various embodiments, other such scales and thresholds may be assigned to other accuracy estimate levels discussed herein as well. If the accuracy is very low, the smart waste receptacle may request manual entry or selection from high-likelihood options of the identity of the product or item at step 309. If the accuracy is estimated to be between those thresholds, the smart waste receptacle may request a user to resolve any ambiguity at step 308. For example, if the smart waste receptacle positively identifies a piece of waste as a mayonnaise jar but cannot determine which brand it is, the smart waste receptacle may request the user identify which brand it is. The user feedback may be used to not only rectify the ambiguity of the piece of waste, but also to feed back to the computer sensor system at step 310 as training date to improve future waste identification.

In an embodiment, if accuracy is low or below a threshold, the smart waste receptacle may present one or more images of the waste or a video sequence comprising a plurality of frames of the waste as it is introduced to the smart waste receptacle to human reviewers for coding. The human reviewers may be other than the user of the smart waste receptacle and may be, for example, employees, contractors, crowd sourced users, or other individuals. In some embodiments, the human reviewers are paid for coding the images or video sequence. In an embodiment, the human reviewers are presented with the one or more images of the waste or a video sequence comprising a plurality of frames of the waste and prompted to input or confirm the correct identity of the waste. In an embodiment, the human reviewers are prompted to enter their confidence in their classification, and if the confidence is low than a second or plurality of additional reviewers may also be prompted to code the same one or more images or video sequence. By providing human review, the smart waste receptacle may achieve 100% accuracy, or close to it, without requiring input from the user of the smart waste receptacle. If the accuracy is very low, the smart waste receptacle may request manual entry or selection from high-likelihood options of the identity of the product or item at step 309 from human reviewers. If the accuracy is estimated to be between a high accuracy threshold and low accuracy threshold, the smart waste receptacle may request a human reviewer to resolve any ambiguity at step 308.

Once the waste has been identified to the extent possible, and any external information associated, the smart waste receptacle may determine certain qualities of the waste based on the identification of the waste. For example, in an embodiment, the smart waste receptacle may categorize the waste as either recyclable or non-recyclable based on the identity determined above. In an embodiment, the smart waste receptacle may transmit an identity of the waste to a central computing platform to assist in determining the recyclability of individual items. The central computing platform may use a product database, heuristics, or a machine learning algorithm to determine if the waste is recyclable. In some embodiments, the central computing platform may determine the recyclability of waste based on the location of the smart waste receptacle. For example, if one type of plastic is recyclable in a first jurisdiction but not in a second, the central processing platform would indicate the appropriate level of recyclability for each respective smart waste receptacle.

Once the recyclability of the waste is determined an indicator light signaling to the user may be engaged to indicate whether or not the waste can be recycled. Then, the user can direct the waste to the appropriate bin in the smart waste receptacle. In this way, the smart waste receptacle may assist the user in sorting recyclable waste content from non-recyclable waste.

Figure 4:
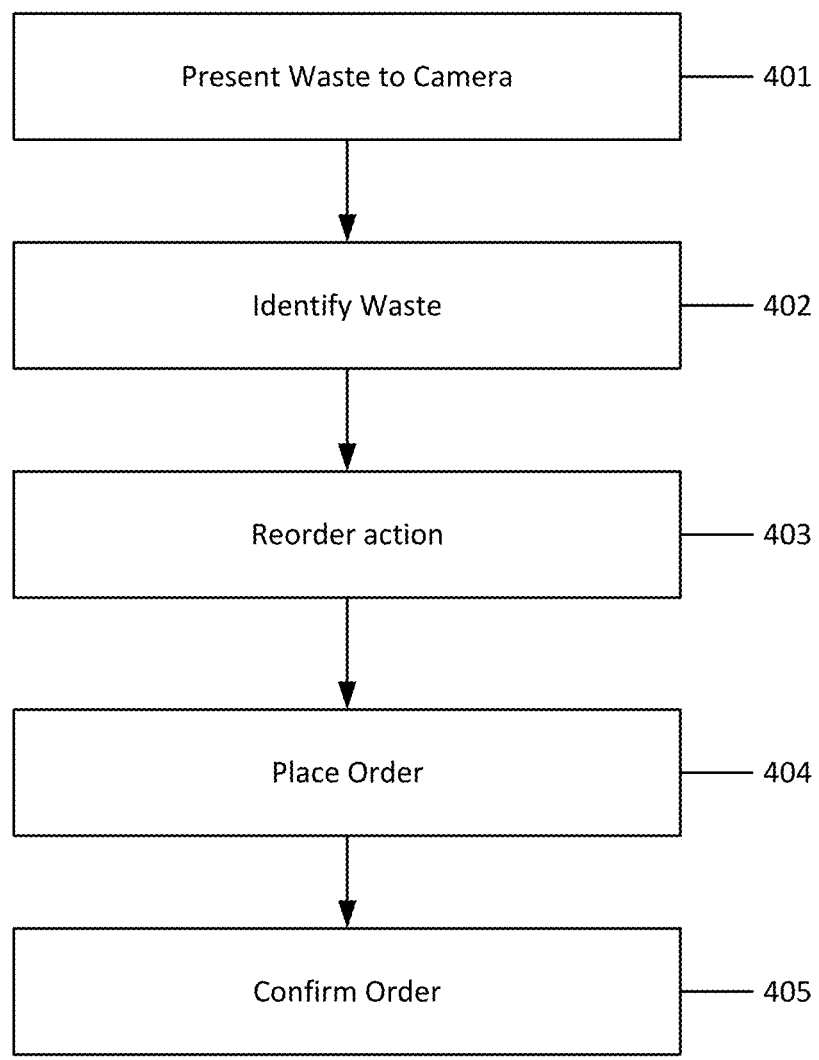
FIG. 4 illustrates a method for reordering supplies according to an embodiment.

FIG. 4 illustrates a method 400 for reordering supplies according to an embodiment. At step 401, a user presents a unit of waste to a smart waste receptacle such as smart waste receptacle 100, 200, or 300. For example, a user may actuate a foot pedal to open a lid of the smart waste receptacle and hold the unit of waste up to a sensor system embedded in the lid of the smart waste receptacle. In another example, presenting a unit of waste to a smart waste receptacle may include a user simply throwing a unit of waste into the receptacle, and the smart waste receptacle captures images of the waste as it is entering the smart waste receptacle. At step 402, the smart waste receptacle recognizes the waste using a method such as method 300. User feedback may be presented to the user by the smart waste receptacle indicating that the unit of waste has been recognized. For example, a green light may signify that the smart waste receptacle successfully recognized the waste. Next, at step 403, the user may indicate that they want to reorder the item. For example, the user may press a 'reorder' button on the smart waste receptacle that signifies an instruction to reorder the item that they are disposing of. In some embodiments, this user interaction may take place before the smart waste receptacle has indicated that the unit of waste has been recognized. For example, the user may press the 'reorder button' and then present the unit of waste to the smart waste receptacle. The smart waste receptacle would then apply the input of the instruction to reorder to the next or previous unit of waste recognized, within some threshold amount of time.

In response to receiving the instruction to reorder, at step 404 the smart waste receptacle contacts a merchant or third party service and places an order for a product to replace the recognized waste that was placed into the smart waste receptacle. For example, if the waste was identified as an empty food container, the smart waste receptacle may contact a grocery merchant and place an order for a new package of that food to be delivered to the user. In some embodiments, the smart waste receptacle adds the product to a shopping list which is later confirmed by a user in optional step 405.

In some embodiments, the smart waste receptacle may communicate with a merchant platform that has a record of the user's shipping address, billing information, shipping preferences, product preferences, and any other information required to initiate the reorder purchase. The merchant platform may store the ordering information centrally and interface with third-party merchants to fulfill orders or may be integrated directly into a commerce platform for order fulfillment.

Figure 5:
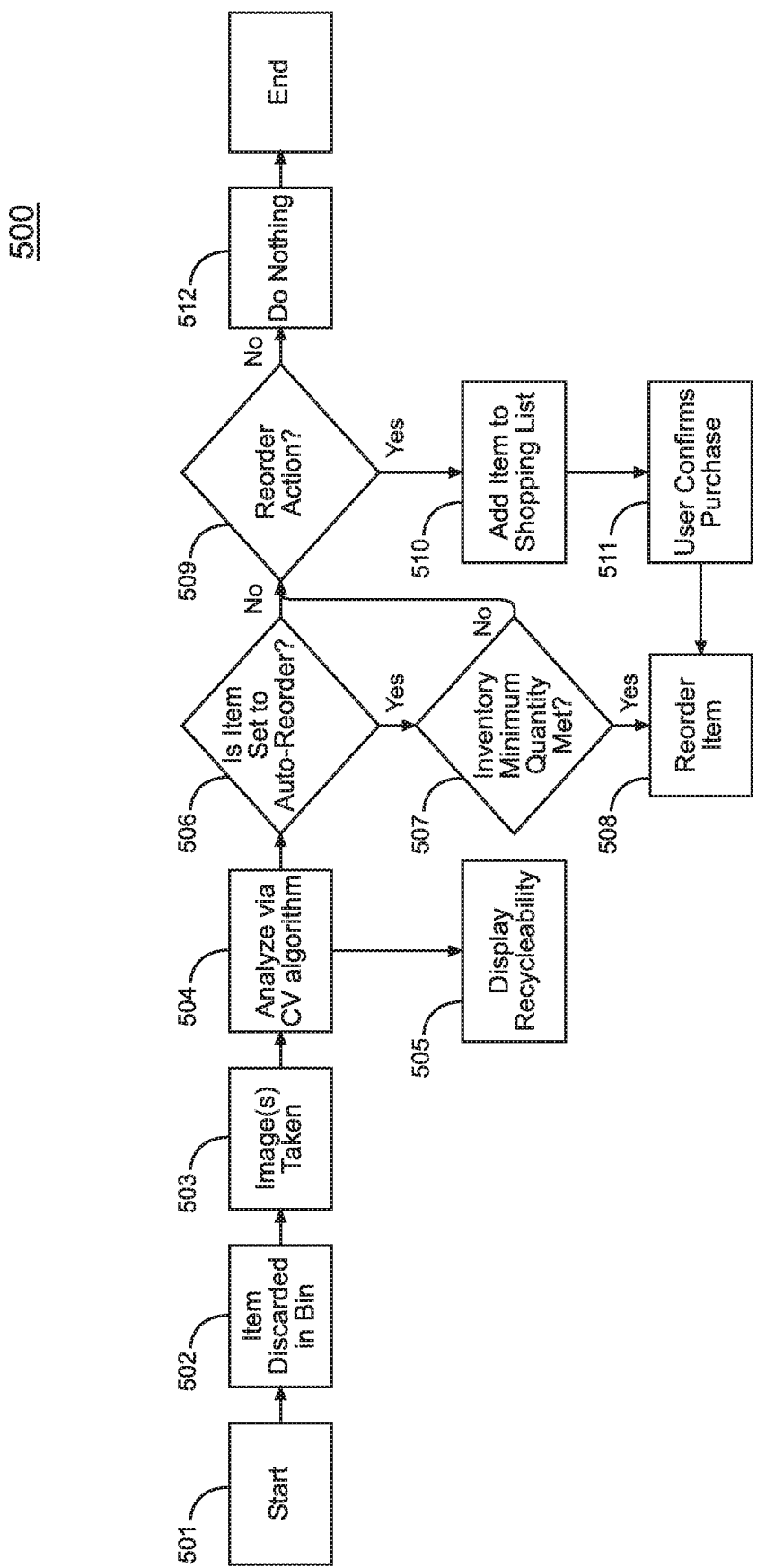
FIG. 5 illustrates a method for automatic reordering supplies according to an embodiment.

FIG. 5 illustrates a method 500 for automatic reordering supplies according to an embodiment. Steps 501 through 504 are analogous to steps 401 through 404 of method 400. At step 505, the recyclability of the waste may be displayed to a user. Then, the user can direct the waste to the appropriate bin in the smart waste receptacle. In this way, the smart waste receptacle may assist the user in sorting recyclable waste content from non-recyclable waste.

At step 506, the smart waste receptacle may compare the identity of the waste with a reorder preference database to determine that the waste is designated for automatic reorder. In an embodiment, the smart waste receptacle may communicate with a central processing platform to determine that the waste is designated for automatic reorder. For example, the central processing platform may integrate with a merchant platform and receive user preferences identifying individual items or categories of items for automatic reordering.

At step 507, after the waste has been designated for automatic reorder, the smart waste receptacle may retrieve an estimated inventory amount and compare the current estimated inventory amount against a threshold value set by the user. For example, the smart waste receptacle may estimate current inventory based on purchase history. If a user orders 10 units of an item and 4 have been recognized as they were being disposed of by the smart waste receptacle, the system may estimate an inventory of 6 units. A user may set as threshold a desired inventory of 7 units, so in this case, the smart would determine to place an order for 1 additional unit to maintain desired inventory levels. In some embodiments, the smart waste receptacle may be configured to always reorder certain items regardless of estimated inventory quantity.

If the inventory minimum is met, the smart waste receptacle may place an order for the product or item at step 508. This process continues similarly to method 400, however here the user did not need to explicitly indicate an instruction to reorder the product at the time of disposal. Rather, in this embodiment, the smart waste receptacle places the order automatically based on pre-received user preferences or instructions. This automatic ordering may be preferable for some categories of items that users don't want to run out of such as, for example, diapers, paper towels, toilet paper, or other such items.

If the item is not set for automatic reordering, or the minimum inventory level is high enough so that an automatic reorder is not triggered, at step 509 a user may manually instruct the smart waste receptacle to place an order for the identified product or item. In some embodiments, the manual reorder action is pressing a button. In some embodiments, the smart waste receptacle may add the item to a shopping list at step 510 and only place the order at step 508 once a user has confirmed the purchase at step 511. If the item is not set for automatic reordering, and the minimum inventory level is high enough so that an automatic reorder is not triggered, and a user does not manually trigger a reorder, the smart waste receptacle proceeds to step 512 and does not reorder any product.

Figure 6:
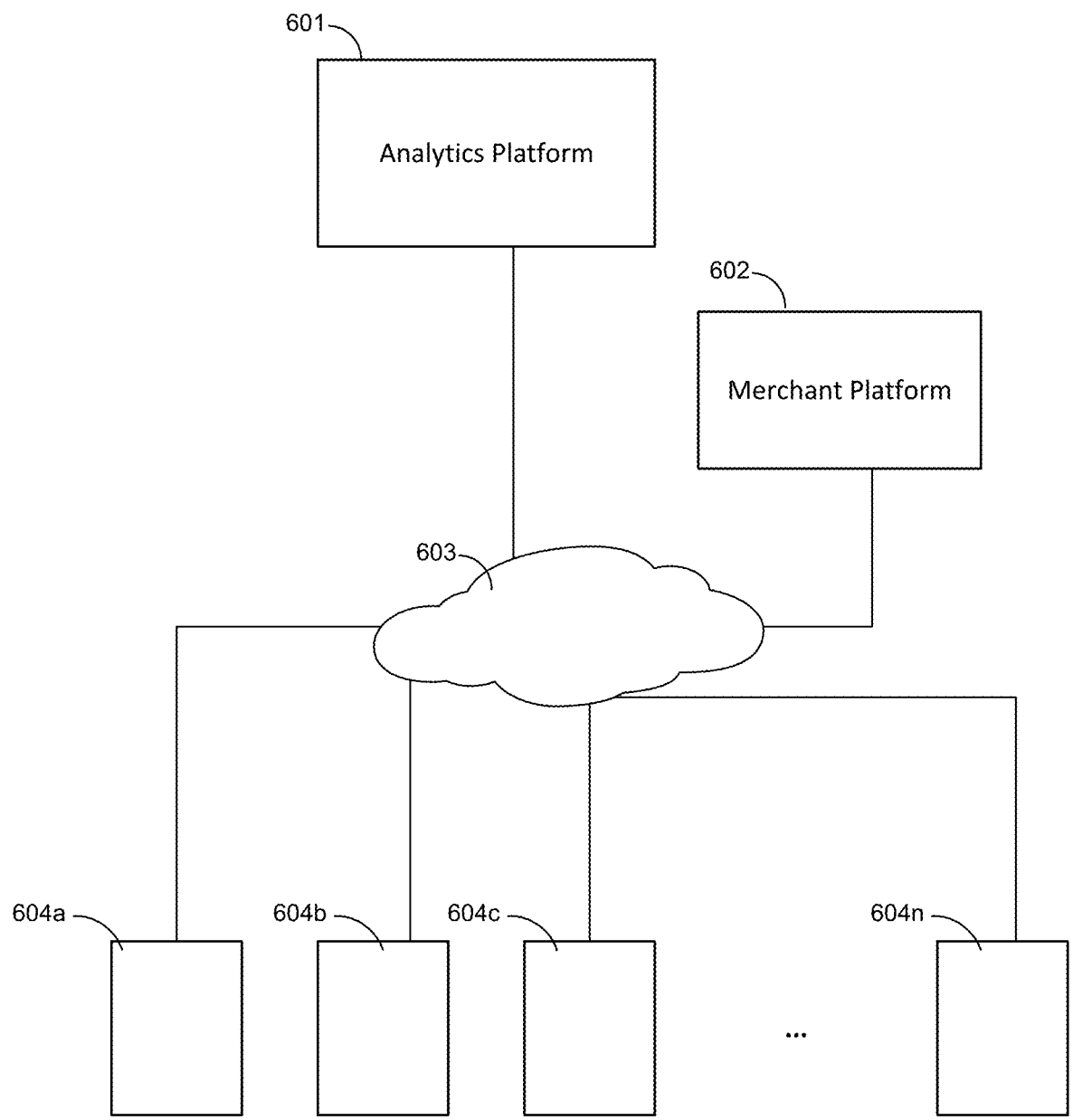
FIG. 6 illustrates a system for product analytics according to an embodiment.

FIG. 6 illustrates a system 600 for product analytics according to an embodiment. Smart waste receptacles 604*a-n* are smart waste receptacles such as described in various embodiments herein. Product analytics platform 601 receives information regarding the waste identified by each smart waste receptacle through network 603. The information may include, for example an identity of the waste and a timestamp of when the waste was discarded. Product analytics platform 601 may interface with a number of other data sources such as a merchant platform 602. Merchant platform 602 may provide information about new product orders and deliveries that can be combined with waste information gathered by product analytics platform 601. For example, merchant platform may have a record of a user purchasing a product at a first date. Then, at a later time, product analytics platform 601 may receive an indication that the user has discarded the product. Thus, by combining these two sources of information, product manufacturers and retailers may gain valuable insight as to the consumption behavior and habits of users of their products. For example, a product manufacturer may be able to determine how long a food item is typically stored before consumption, or the rate of consumption at various times or seasons.

Similarly, this combination of data may provide insight into other sources from which users acquire products. For example, the analytics platform may infer that a user purchased a product at a source other than the merchant platform if the merchant platform has no record of a user purchasing an item that has been identified by a smart waste receptacle. This information may suggest to the merchant platform to carry the product to satisfy the user's previously unknown demand.

In some embodiments, smart waste receptacles may report additional information beyond just identification of waste. For example, smart waste receptacles may report an estimated condition of the waste being discarded. One example of condition may be amount used or amount unused. For example, a smart waste receptacle may estimate that only half of a food product has been used based at the time of disposal. This information may be valuable to the manufacturer to learn consumer's actual usage and consumption habits and trends. Another example of condition may include estimates of wear or disrepair. For example, smart waste receptacles may estimate the condition of shoes being discarded as being very worn or being in like-new condition. These estimates may be derived from computer vision techniques such as described above or include actual images of the products being discarded.

For any embodiment of product analytics platform 600, data may be anonymized and aggregated for report. Broader trends may be devised in such a way too, such as determining a rate of recycling compliance for a region by identifying recyclable waste and recording which waste bin it was discarded in. In some embodiments, more granular information may be recorded and made available. For example, a waste monitoring dashboard may be made available to users to monitor and track their consumption and waste habits. This may, for example, assist users in identifying trends and habits that they can then use to enact change to reduce waste or other similar goals.

Figure 7:
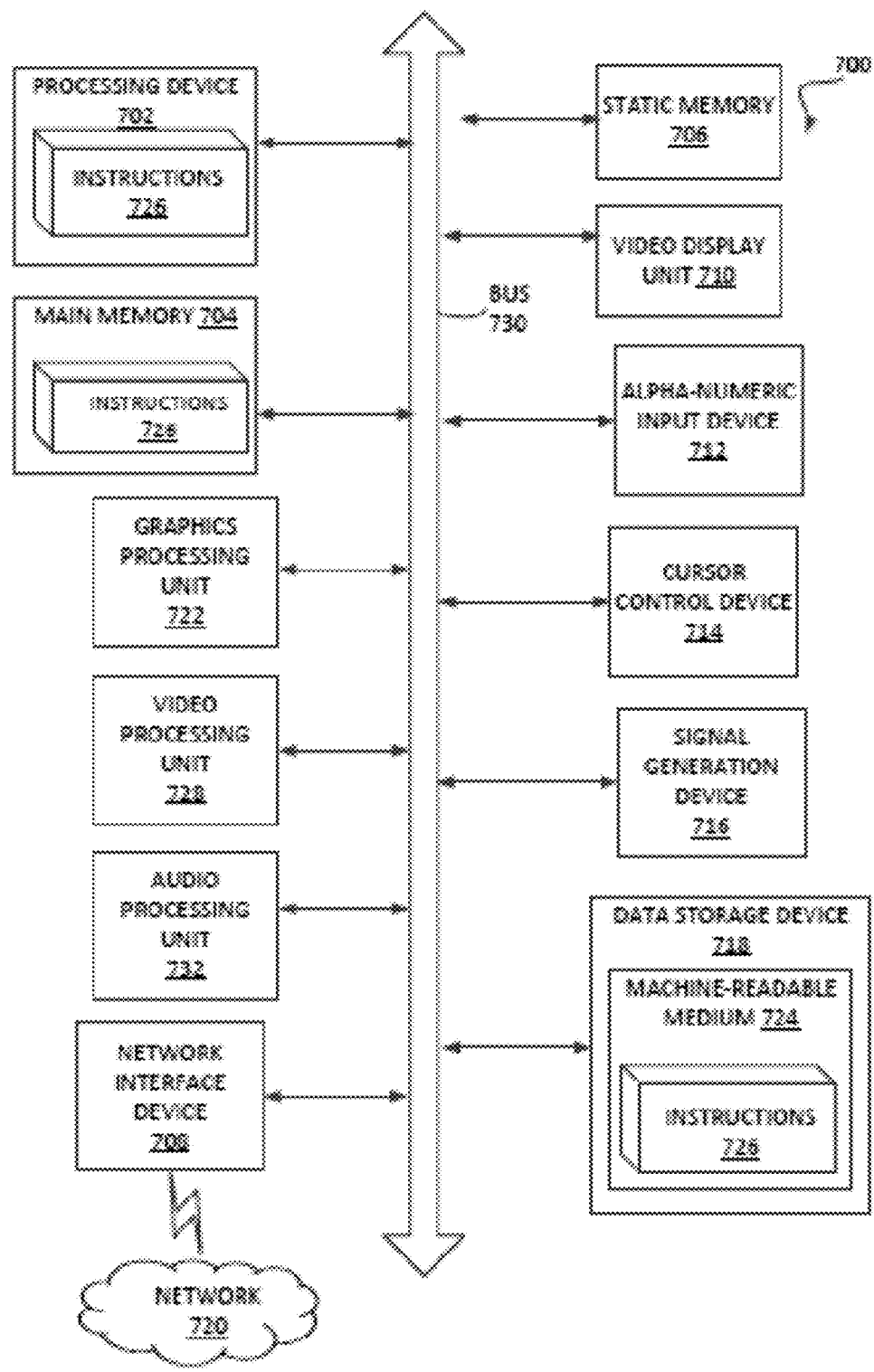
FIG. 7 illustrates an example machine of a computer system within which a set of instructions, for causing the machine to perform any one or more of the methodologies discussed herein, may be executed.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A smart waste receptacle system, comprising:
   a smart waste receptacle;
   a sensor associated with the smart waste receptacle and configured to acquire an image of waste;
   a vision system configured to receive the image of the waste from the sensor and determine an identity of the waste based on the image;
   a controller, wherein the controller is further configured to:
   determine an accuracy estimate of the type of the waste, and based on the accuracy estimate present to a user one identified waste item where the accuracy estimate is greater than a predefined threshold value, and present to the user for selection one of multiple identified waste items where the accuracy estimate is lower than the predefined threshold value; and compare a product associated with the waste with a reorder preference database to determine whether the product is designated for automatic reorder, and when the product is so designated:
retrieve an estimated user inventory amount of the product based on a purchase history of the product,
compare the estimated user inventory amount against a predefined threshold value, and
automatically reorder the product when the estimated user inventory amount is lower than the predefined threshold value; and
an analytics system for tracking how long a user stores food before consumption and the rate of consumption, wherein the tracking is based on a date of the automatic reorder of the product and a date the waste is determined to be discarded by the vision system.

2. The smart waste receptacle system of claim 1, further comprising a display system configured to display an indication of the identity of the waste.

3. The smart waste receptacle system of claim 1, further comprising:
a lid configured to cover a top portion of the smart waste receptacle,
wherein the sensor is positioned on the underside of the lid.

4. The smart waste receptacle system of claim 1, further comprising a supplemental lighting system positioned to illuminate the waste when the sensor acquires the image of the waste.

5. The smart waste receptacle system of claim 1, wherein the vision system is configured to transmit the image of the waste to an image processing device and receive from the image processing device an identity of the waste in the image.

6. The smart waste receptacle system of claim 1, further comprising a replenishment system configured to transmit, to a merchant platform, an order for a product corresponding to the identity of the waste.

7. The smart waste receptacle system of claim 1, further comprising:
a first bin associated with a first category of waste; and
a second bin associated with a second category of waste,
wherein a controller is configured to receive the identity of the waste from the vision system and, based on the identity, categorize the waste into either the first category of waste or the second category of waste.

8. The smart waste receptacle system of claim 7, further comprising a display system configured to display directions to place the waste in the first waste bin if the waste is in the first category, and to place the waste in the second waste bin if the waste is in the second category.

9. A smart device for attachment to a waste receptacle, comprising:
a sensor associated with the smart device and configured to acquire an image of waste;
a vision system configured to receive the image of the waste from the sensor and determine an identity of the waste and an accuracy estimate based on the image;
an adhesive or other fastener for attaching the smart device to the waste receptacle whereby the waste receptacle is converted to a smart waste receptacle;
a controller configured to receive the identity of the waste and accuracy estimate from the vision system, wherein the controller is further configured to request human feedback regarding the identity of the waste when the accuracy estimate is lower than a predefined threshold, wherein based on the accuracy estimate a user is presented with one identified waste item where the accuracy estimate is greater than the predefined threshold, and the user is presented for selection one of multiple identified waste items where the accuracy estimate is lower than the predefined threshold; and
an analytics system for tracking how long a user stores food before consumption and the rate of consumption, wherein the tracking is based on a date of the automatic reorder of the product and a date the waste is determined to be discarded by the vision system.

10. The smart device of claim 9, further comprising a display system configured to display an indication of the identity of the waste.

11. The smart device of claim 9, wherein the smart device is positioned on the underside of a lid of the waste receptacle.

12. The smart device of claim 9, further comprising a supplemental lighting system positioned to illuminate the waste when the sensor acquires the image of the waste.

13. The smart device of claim 9, wherein the vision system is configured to transmit the image of the waste to an image processing device and receive from the image processing device an identity of the waste in the image.

14. The smart device of claim 9, further comprising a replenishment system configured to transmit, to a merchant platform, an order for a product corresponding to the identity of the waste.

15. The smart device of claim 9, wherein the smart device is configured to be attached to the waste receptacle having a first bin associated with a first category of waste and a second bin associated with a second category of waste, wherein a controller is configured to receive the identity of the waste from the vision system and, based on the identity, categorize the waste into either the first category of waste or the second category of waste.

16. The smart device of claim 15, further comprising a display system configured to display directions to place the waste in the first waste bin if the waste is in the first category, and to place the waste in the second waste bin if the waste is in the second category.

17. The smart device of claim 9, wherein the human feedback is received from one or more remote reviewers.

18. The smart device of claim 17, wherein the human feedback includes input regarding the identity of the waste and a human-assigned confidence level.

19. The smart device of claim 18, wherein the controller is further configured to request additional human feedback from one or more additional remote reviewers regarding the identity of the waste when the human-assigned confidence level is lower than a predefined threshold.

* * * * *